June 20, 1933.  A. J. COUTU  1,914,736
ANGULAR BALL SWIVEL UNION
Filed May 21, 1930
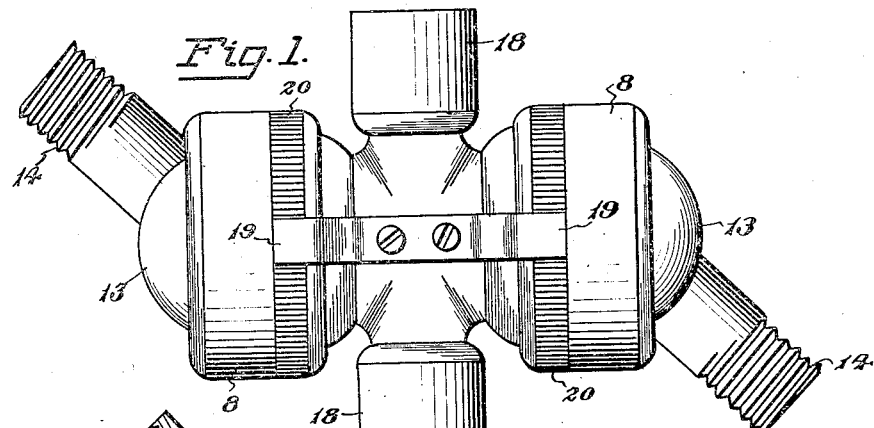
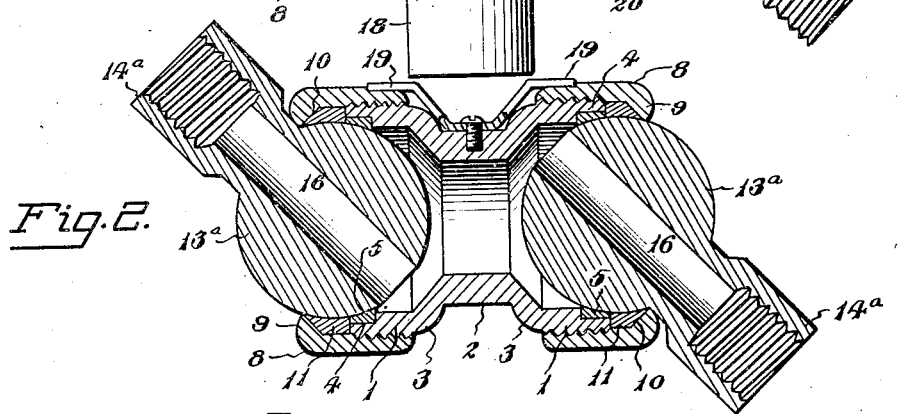
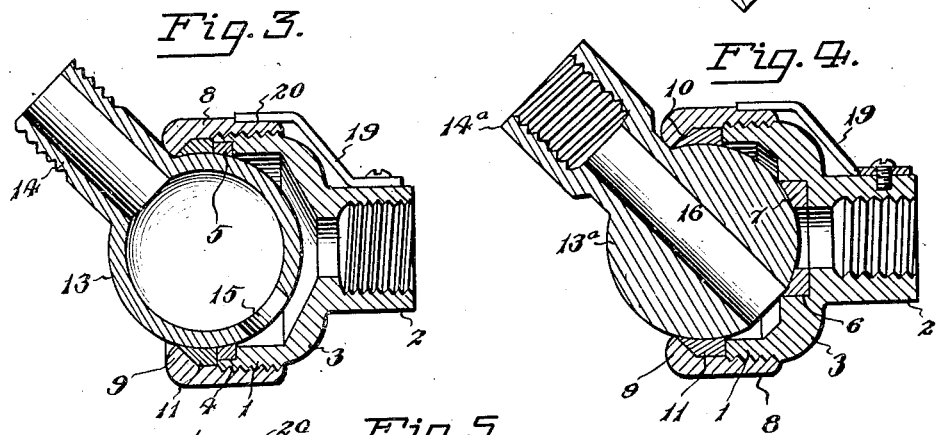
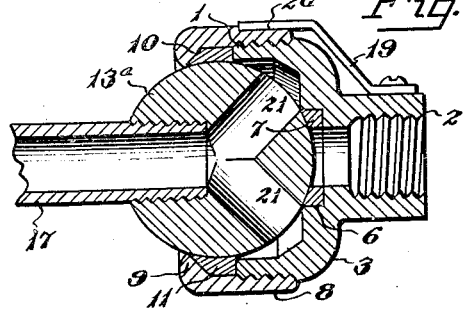
Inventor
Alfred J. Coutu
By Lacey & Lacey,
Attorneys Patented June 20, 1933

1,914,736

UNITED STATES PATENT OFFICE

ALFRED JOACHIM COUTU, OF DETROIT, MICHIGAN

ANGULAR BALL SWIVEL UNION

Application filed May 21, 1930. Serial No. 454,394.

This invention relates to unions for connecting pipe and pipe fittings and provides a coupling having a swivel joint whereby the members may readily adapt themselves to the parts to be connected and admit of such parts being adjusted to any relative angle within the range of movement of the members without leaking.

The invention consists of a union embodying ball and socket members, and intermediate packing having a peculiar arrangement to maintain a tight joint between the members even though the parts are not accurately machined.

And the invention also provides a union of the character aforesaid which may be utilized as a cut off for controlling the flow therethrough.

While the drawing illustrates a preferred embodiment of the invention, it is to be understood that in adapting the means to meet specific needs and requirements, the design may be varied and changes in the minor details of construction may be resorted to without departing from the spirit thereof.

For a full understanding of the invention and the merits thereof, reference is to be had to the following description and the drawing hereto attached, in which:

Figure 1 is a detail view of a multiple ball swivel union embodying the invention and having a plurality of coupling ends.

Figure 2 is a central longitudinal sectional view of a modified form of the ball swivel union.

Figure 3 is a sectional view of a single form of the ball swivel union.

Figure 4 is a sectional view of a further modification showing the union adapted as a cut-off.

Figure 5 is a view similar to Figure 4, of a further modification.

Corresponding and like parts are referred to in the following description and designated in the several views of the drawing by like reference characters.

The union may be either single or multiple and, in either event, comprises a ball and a socket. The multiple union contemplates a body having more than one ball and socket joint, whereby to admit of independent adjustment of each of the parts connected thereby. The body of the multiple union may likewise be provided with one or more nipples, or coupling ends, for connection thereto of laterals, or branch pipes, in substantially the same manner as multiple pipe fittings. The single union embodies but one ball and socket.

A union embodying the invention comprises a ball, a socket, a nut forming connecting means between the ball and socket, and intermediate packing to maintain a tight joint under all conditions. The packing may consist of fiber, rubber, or other suitable material generally employed for packing pipe joints. The remaining parts of the union are of metal, the particular kind depending upon the size and special use for which the union is designed.

The socket member comprises an enlarged portion 1, a reduced portion 2, and an intermediate portion 3. The part 1 is externally screw threaded whereas the part 2 is usually internally screw threaded to make connection with the part to be coupled thereto. In the form shown in Figures 2 and 3 of the drawing, the part 1 is recessed, as indicated at 4, to receive a packing 5. In the arrangement illustrated in Figures 4 and 5, the intermediate part 3 is recessed at 6 to receive a packing 7. A nut 8 is threaded upon the part 1 and is formed at its outer end with an inner flange or lip 9, the inner face of which is beveled as indicated at 10, to engage the ball member at one side of a diametrical plane. A packing 11 is confined between the beveled or inclined face 10 and the end of the socket member upon which the nut 8 is threaded. The end of the packing 11 abutting the end of the socket member is straight, whereas the opposite end is beveled or inclined to conform to the inclination or bevel of the face 10. That portion of the nut 8 opposite the packing 11 is plane or devoid of threads to insure a substantial joint between the packing and nut.

The ball member may be hollow, as indicated at 13, in Figure 3, or it may be solid, as shown at 13a in Figures 2, 4 and 5. The hollow ball 13 is provided with a nipple 14 to receive the part to be connected or coupled by means of the union. An opening 15 is formed in a side of the ball 13 opposite the nipple 14 and provides for the flow of fluid through the union. A diametrical opening 16 is formed in the solid ball 13a and one end of this opening is enlarged and threaded, as indicated in Figure 5, to receive a pipe 17 or other part to be connected. In the form shown in Figures 2 and 4, the ball 13a has an internally threaded nipple 14a formed therewith.

Referring particularly to Figures 2 and 3, it will be seen that the inner portion of the ball is spaced from the intermediate portion 3 of the socket member, thereby preventing closing of the openings 15 or 16 when adjusting the ball within the socket. The packing 11 engages the ball 13 upon one side of a plane passing diametrically through said ball. The packing 5 engages the ball upon the opposite side of said plane. It will thus be understood that the arrangement of the packing prevents relative inward or outward movement of the ball while admitting of it turning freely in every direction within certain limits determined by the play of the nipple in the outer open end of the nut 8.

In the arrangement shown in Figures 4 and 5 of the drawing, the inner part of the ball 13a engages the packing 7 and the packing 11 engages the outer portion of the ball to prevent its displacement from the nut. This construction admits of adapting the ball 13a to close the opening 16 and cut off the flow through the union or to control the flow, as may be required, in substantially the same manner as a valve.

The multiple union shown in Figures 1 and 2 comprises a body having sockets with which cooperate balls and confining nuts. The body is contracted at a medial point and its ends are enlarged to form the sockets. Nipples or coupling ends 18 project laterally from the body to admit of branch pipes, fittings, or other parts, being coupled to the union. The number and position of the coupling elements 18 will depend upon the specific use to which the union is to be put.

When the middle portion of the body is clear of coupling elements, it is of polygonal formation to receive a spanner or wrench to enable a firm hold being obtained when desired for any purpose.

To secure the nuts 8 there is provided a lock spring 19 which is fastened in any preferred way to the body of the union and engages fine teeth 20 formed around the nut. Each of the nuts 8 has a lock spring 19 associated therewith. In the multiple form of union depicted in Figures 1 and 2, the lock spring is double and consists of a single length of spring material attached at a middle point to the body of the union and having its end portions bent to engage the nuts 8.

Figure 5 of the drawing, shows a cut-off form of ball swivel union in which the ball is formed with a plurality of angling openings 21 connecting with the opening in which the pipe 17 is fitted. That part of the ball between the outer ends of the openings 21 is of an extent to obtain a seat on the packing 7 and cut off communication through the union when the pipe 17 and end 2 are in line, thereby differing from the form shown in Figure 4 in which the communication or passage through the union is cut off when the parts 14a and 2 are out of line.

What is claimed is:

A ball swivel union comprising a socket member including an enlarged end portion, a reduced end portion, and an intermediate portion, a packing fitted to the intermediate portion of the socket in line with the opening therein, a ball having an opening therethrough and in engagement with said packing, a nut threaded upon the enlarged end portion of the socket member and having an inner projecting portion at its outer end, said projecting portion being beveled on its inner face, and a packing in the outer portion of the nut abutting the outer end of the socket member and the beveled portions of the nut and engaging said ball to insure a tight joint between the nut and ball, the ball being free to move in all directions.

In testimony whereof I affix my signature.

ALFRED JOACHIM COUTU. [L. S.]